(12) United States Patent
Lin

(10) Patent No.: US 11,457,139 B2
(45) Date of Patent: Sep. 27, 2022

(54) PHOTOGRAPHY METHOD, ELECTRONIC DEVICE, AND STORAGE MEDIUM

(71) Applicant: BEIJING XIAOMI MOBILE SOFTWARE CO., LTD., Beijing (CN)

(72) Inventor: Xingsheng Lin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/244,233

(22) Filed: Apr. 29, 2021

(65) Prior Publication Data

US 2022/0078335 A1 Mar. 10, 2022

(30) Foreign Application Priority Data

Sep. 9, 2020 (CN) .......................... 202010942772.2

(51) Int. Cl.
| | |
|---|---|
| *H04N 5/232* | (2006.01) |
| *G06T 7/50* | (2017.01) |
| *G06T 7/73* | (2017.01) |
| *G06V 10/40* | (2022.01) |
| *G06T 11/00* | (2006.01) |

(52) U.S. Cl.
CPC .......... *H04N 5/23218* (2018.08); *G06T 7/50* (2017.01); *G06T 7/73* (2017.01); *G06T 11/00* (2013.01); *G06V 10/40* (2022.01); *H04N 5/232935* (2018.08)

(58) Field of Classification Search
None
See application file for complete search history.

(56) References Cited

U.S. PATENT DOCUMENTS

| | | | |
|---|---|---|---|
| 10,665,034 B2 | 5/2020 | Rainisto et al. | |
| 2013/0329950 A1 | 12/2013 | Yang | |
| 2016/0344929 A1* | 11/2016 | Gyotoku | .......... H04N 5/232939 |
| 2019/0011921 A1 | 1/2019 | Wang et al. | |
| 2019/0116322 A1* | 4/2019 | Holzer | ................... G06V 10/34 |
| 2019/0311480 A1* | 10/2019 | Harrison | ................ H04N 5/272 |

FOREIGN PATENT DOCUMENTS

EP 0662600 A1 7/1995

OTHER PUBLICATIONS

European Patent Application No. 21171117.1 extended Search and Opinion dated Oct. 21, 2021, 9 pages.
Indian Patent Application No. 202144019177 Office Action dated Mar. 24, 2022, 6 pages.

* cited by examiner

*Primary Examiner* — James M Anderson, II
(74) *Attorney, Agent, or Firm* — Lathrop GPM LLP

(57) ABSTRACT

A photography method, includes: receiving an instruction of launching to collect images; establishing an AR anchor in an image viewfinder of the electronic device, the AR anchor corresponding to a position of a photographed object in a virtual three-dimensional space; generating a moving shot track in the image viewfinder based on a current position of the camera module and the AR anchor, the moving shot track representing a desired moving route of the camera module in the virtual three-dimensional space; and performing image collection on the photographed object based on the moving shot track.

16 Claims, 9 Drawing Sheets

PHOTOGRAPHY METHOD, ELECTRONIC DEVICE, AND STORAGE MEDIUM

CROSS-REFERENCE TO RELATED APPLICATIONS

This application is based on and claims priority to Chinese Patent Application No. 202010942772.2 filed on Sep. 9, 2020, the content of which is hereby incorporated by reference in its entirety into this disclosure.

BACKGROUND

Presently, in order to obtain a video with specific effect, a moving shot is generally employed when shooting the photograph. That is, photography is performed by moving the camera position, changing an optical axis of a camera lens, or changing a focal length of a camera lens, which is also known as "moving shot" (or "camera movement"). In order to perform a moving shot, operations such as selecting a position and laying a guide track require multiple professionals and hardware, which is inconvenient for a user of an ordinary terminal. Moreover, such operations are expensive due to the requirement of extra labor and equipments.

SUMMARY

The disclosure relates to the field of control technologies, and more particularly, it relates to a photography method, an electronic device, and a storage medium.

According to a first aspect of embodiments of the disclosure, a photography method is provided, which is applicable to an electronic device provided with a camera module thereon. The method includes: receiving an instruction of launching to collect images; establishing an augmented reality (AR) anchor in an image viewfinder of the electronic device, the AR anchor corresponding to a position of a photographed object in a virtual three-dimensional space; generating a moving shot track in the image viewfinder based on a current position of the camera module and the AR anchor, the moving shot track representing a desired moving route of the camera module in the virtual three-dimensional space; and performing image collection on the photographed object based on the moving shot track.

According to a second aspect of embodiments of the disclosure, there is provided an electronic device. The electronic device includes: a camera, a processor, and a memory. The memory is configured to store a computer program executable by the processor. The processor is configured to execute the computer program in the memory to perform the photography method according to the first aspect.

According to a third aspect of embodiments of the disclosure, there is provided a computer-readable storage medium. The photography method according to the first aspect is implemented when an executable computer program stored in the storage medium is executed by a processor.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

Figure 1:
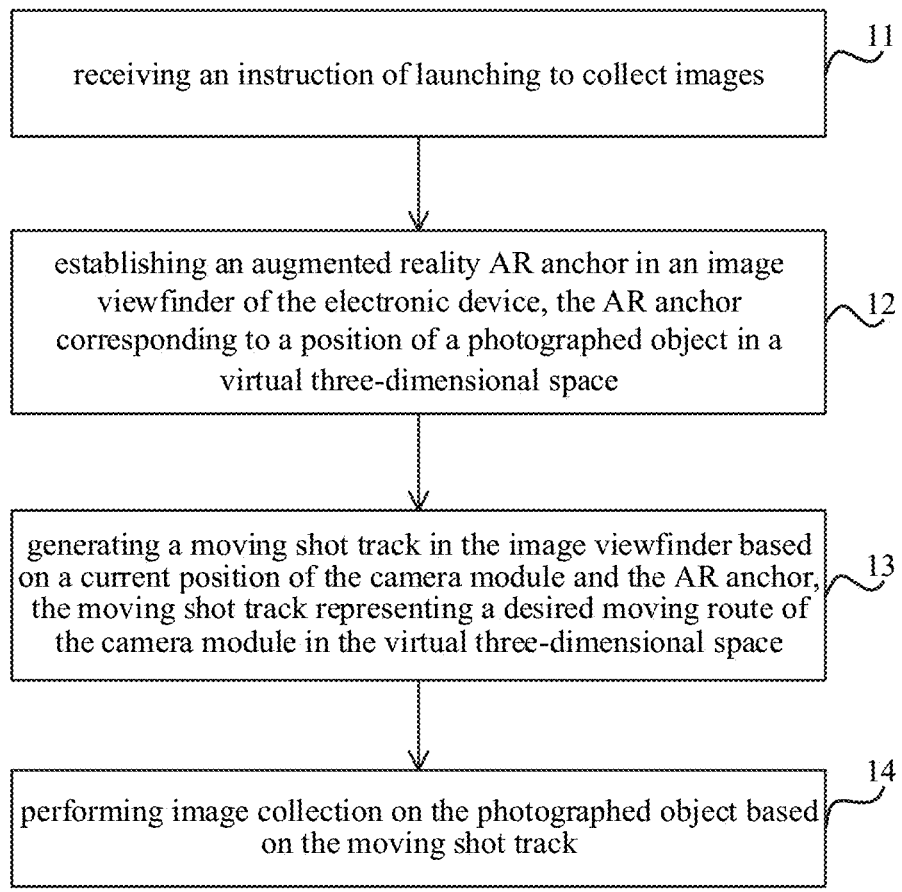
FIG. 1 is a flow chart illustrating a photography method according to some embodiments.

To solve the above technical problems, embodiments of the disclosure provide a photography method. The photography method may be applicable to an electronic device having a camera module provided thereon, such as a smart phone, a tablet and a smart headphone. The electronic device may execute the above photography method when a user turns on the camera module for photography. FIG. 1 is a flow chart illustrating a photography method according to some embodiments. The method includes the actions at blocks 11-14.

At block 11, an instruction of launching to collect images is received.

In embodiments, after the camera module is enabled (or turned on), the electronic device may display an image viewfinder on a display screen, and the user may launch an image collection function by touching the display screen or using a button. The image collection function may employ a video photography function or a continuous photography image function. A processor in the electronic device may detect the display screen or the button, and obtain the instruction of launching to collect images.

At block 12, an AR (augmented reality) anchor is established in the image viewfinder of the electronic device. The AR anchor corresponds to a position of a photographed object in a virtual three-dimensional space.

Figure 2:
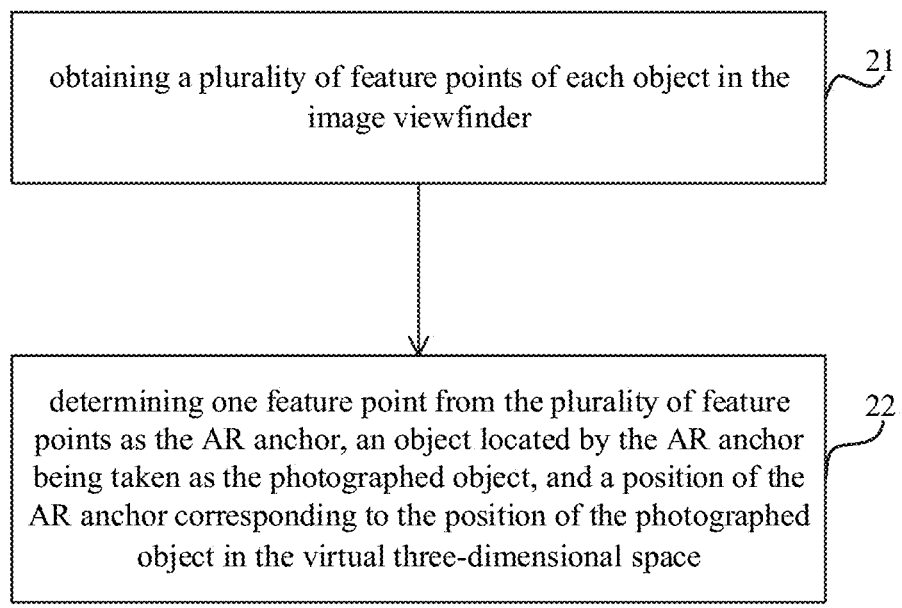
FIG. 2 is a flow chart illustrating determining an AR anchor according to some embodiments.
Figure 3:
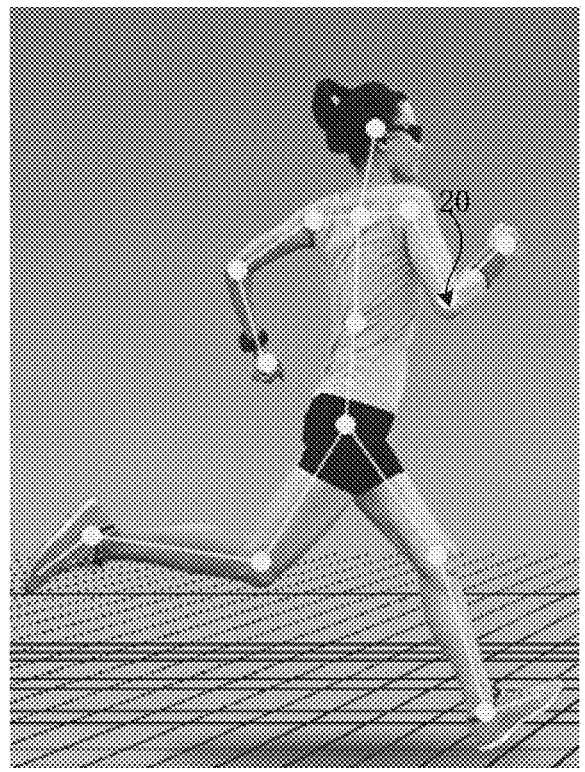
FIG. 3 is a schematic diagram illustrating an effect of an augmented reality scene according to some embodiments.

In embodiments, referring to FIG. 2, at block 21, the processor in the electronic device may obtain multiple feature points of each object in the image viewfinder, and the effect is illustrated in FIG. 3. Referring to FIG. 3, the feature point 20 represents an elbow of people in the image viewfinder and a spatial position of the elbow in the whole image viewfinder (reflected by coordinate data of the feature point and a positional relationship of the feature point relative with other feature points).

Obtaining, by the processor, the multiple feature points of each object in the image viewfinder may include the following.

Figure 4:
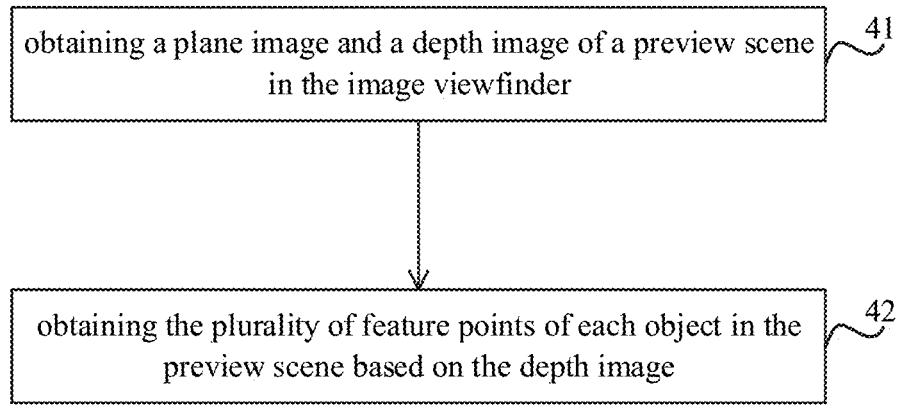
FIG. 4 is a flow chart illustrating obtaining a feature point according to some embodiments.

In an example, the electronic device has an ordinary camera and a depth camera provided thereon. In this way, the ordinary camera may obtain a plane image of a preview scene in the image viewfinder, and the depth camera may obtain a depth image of the preview scene. Referring to FIG. 4, at block 41, the processor may communicate with the ordinary camera and the depth camera respectively, to obtain the plane image and the depth image. At block 42, the processor may obtain the multiple feature points of each object in the preview scene based on the depth image and the plane image. These feature points may reflect an outline and a spatial position of each object, such as a head and an elbow of a character, a foot of a table, and a corner of a room. It may be understood that, attribute data of each feature point may include three-dimensional coordinate data, spatial relationship data of the feature point with other feature points, spatial relationship data of the feature point with a shot, and the like, and may be set based on a detailed scene. Finally, the processor may insert the multiple feature points into the object of the preview scene. A process of inserting the feature points into the preview scene may refer to the related art, which is not elaborated here.

Figure 5:
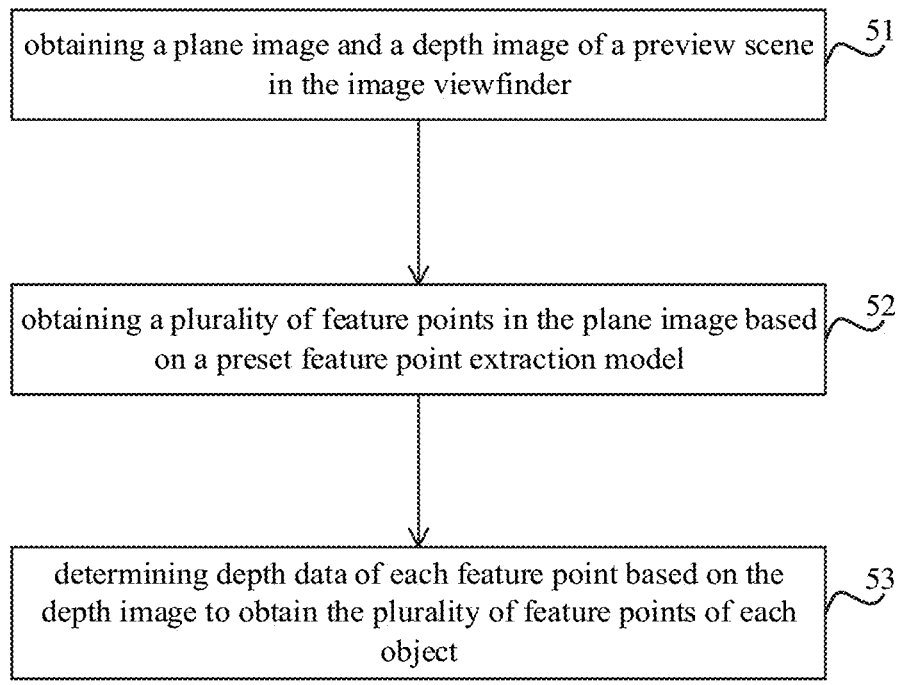
FIG. 5 is a flow chart illustrating obtaining a feature point according to some embodiments.

In another example, the electronic device has the ordinary camera and the depth camera provided thereon, such that the ordinary camera may obtain the plane image of the preview scene and the depth camera may obtain the depth image of the preview scene. Refer to FIG. 5, at block 51, the processor may obtain the plane image and the depth image of the preview scene. At block 52, the processor may call a feature point extraction model set in advance, such as a FAST (Features from accelerated segment test) algorithm, a SIFT (Scale Invariant Feature Transform) algorithm, a SUFR (Speeded-Up Robust Features) algorithm, an ORB (Oriented Fast and Rotated Brief) algorithm, or a HARRIS algorithm, and input the plane image into the feature point extraction model, thereby obtaining the multiple feature points in the plane image. It may be understood that, the attribute data of each feature point may include two-dimensional coordinate data, plane relationship data of the feature point with other feature points, plane relationship data of the feature point with the shot, and on the like. At block 53, the processor may determine depth data of each feature point based on the depth image, and update the plane relationship to the spatial relationship, that is, each feature point is migrated from a plane coordinate system to a three-dimensional coordinate system. In this way, the attribute data of each feature point may include the three-dimensional coordinate data, the spatial relationship data of the feature point with other feature points, and the spatial relationship data of the feature point with the shot. Finally, the processor may insert the multiple feature points into the object of the preview scene.

It should be noted that, the core of the action is that, after the image collection function is enabled, a current ordinary photography mode (that is, any object in the preview scene is displayed) may be automatically switched to the virtual three-dimensional space, to achieve the effect as illustrated in FIG. 3 that the multiple feature points are included.

Referring to FIG. 2, at block 22, one feature point is determined from the multiple feature points as the AR anchor. An object located by the AR anchor is taken as the photographed object, and the position of the AR anchor corresponds to the position of the photographed object in the virtual three-dimensional space. In the embodiments, the processor communicates with the display in the electronic device, and controls the display to display the image viewfinder, such that the multiple feature points are shown to the user. The user may trigger the electronic device in a way such as pressing the button or touching the display, for example, the user clicks the feature point 20 in FIG. 3. In this way, the processor may determine a feature point in the image viewfinder as the AR anchor based on the trigger operation. It should be understood that, the object located by the AR anchor is taken as the photographed object. In other words, the user selects the photographed object in the virtual three-dimensional space by selecting the AR anchor.

At block 13, a moving shot track is generated in the image viewfinder based on a current position of the camera module and the AR anchor. The moving shot track represents a desired moving route of the camera module in the virtual three-dimensional space.

In embodiments, generating, by the processor in the electronic device, the moving shot track based on the current position of the shot in the electronic device and the AR anchor includes the following.

In an example, a template library is preset in the electronic device. The template library includes multiple templates. Each template includes a target shape of the moving shot track and a relative position between a reference point and the moving shot track. For example, when a template 1 includes that a shape of the moving shot track is circular, and a relative position between the reference point and the moving shot track is the radius, the template 1 corresponds to a moving shot skill of a surround. When a template 2 includes a vertical line segment with the shape of the moving shot track from top to bottom, and the reference point is located at an upper end point of the vertical line, the template 2 corresponds to a moving shot skill of a drop. A shape obtained by reversing the shape in template 2 corresponds to a moving shot skill of a lift. When a template 3 includes a horizontal line segment with the shape of the moving shot track from left to right, and the reference point is a left end point of the horizontal line segment, the template 3 corresponds to a moving shot skill of a truck. It should be noted that, merely several templates are listed above, a corresponding template may be set based on a detailed moving spot skill, such as a following shot, a pan & tilt shot, a dolly zoom in shot, and a dolly zoom out shot, and the corresponding templates fall into the scope of the disclosure.

Figure 6:
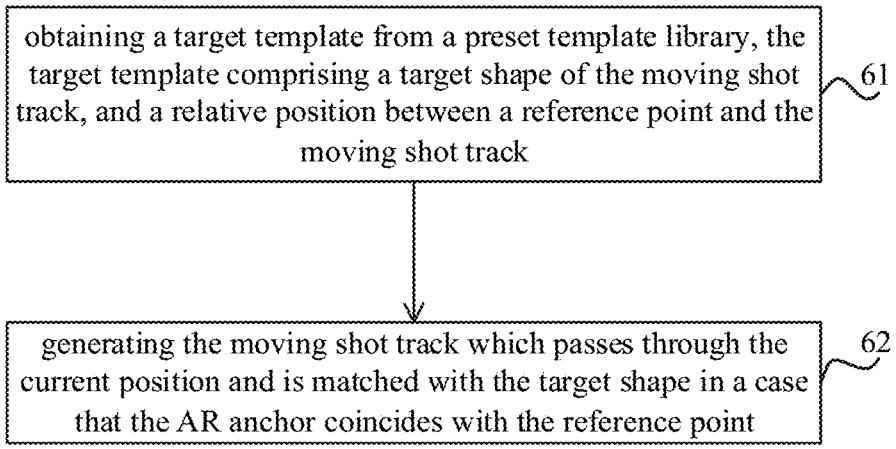
FIG. 6 is a flow chart illustrating generating a moving shot track according to some embodiments.
Figure 7:
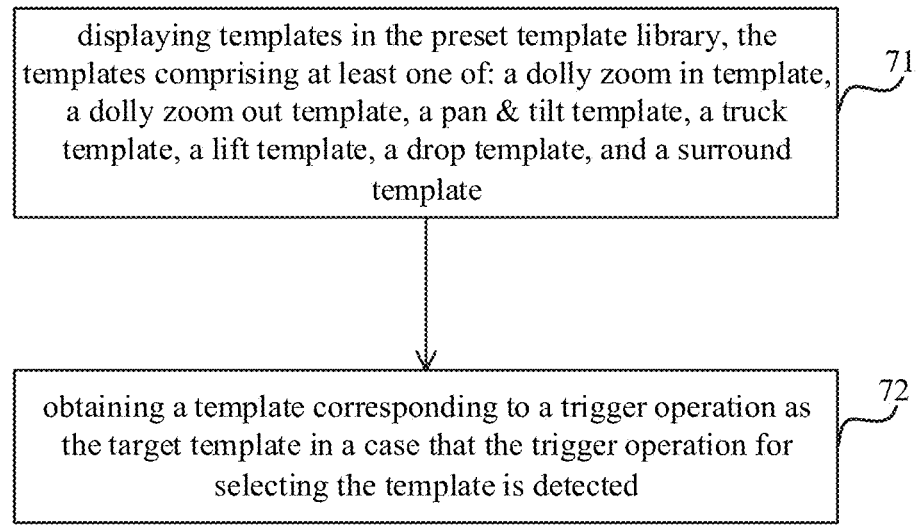
FIG. 7 is a flow chart illustrating obtaining a target template according to some embodiments.

Referring to FIG. 6, at block 61, obtaining, by the processor, a target template from a preset template library as the target template, which may include the following. Referring to FIG. 7, at block 71, templates in the preset template library may be displayed; the templates include at least one of: a dolly zoom in template, a dolly zoom out template, a pan & tilt template, a truck template, a lift template, a drop template, and a surround template; at block 72, a template corresponding to a trigger operation is obtained as the target template in a case that the trigger operation for selecting the template is detected.

Figure 8:
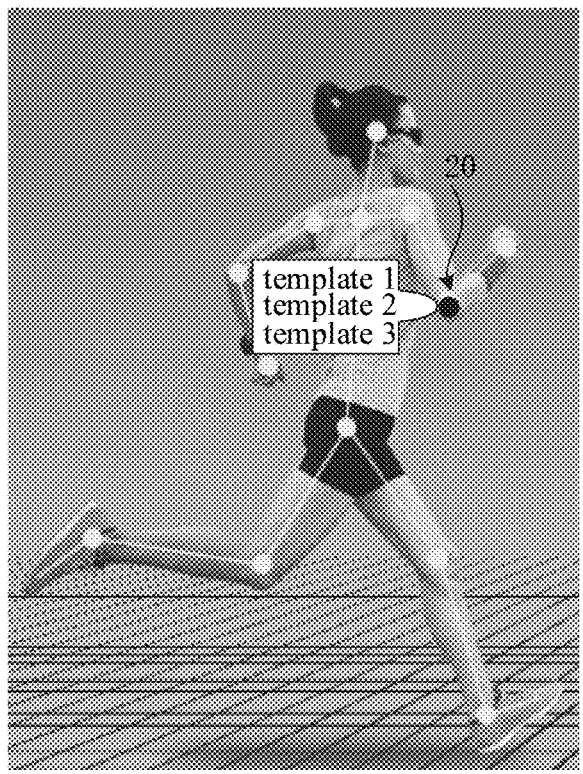
FIG. 8 is a schematic diagram illustrating an effect of a display template according to some embodiments.

For example, at block 71, after the processor determines the AR anchor, multiple templates may be matched from the template library as candidate templates based on the position of the AR anchor or the corresponding object of the AR anchor, and listed and displayed around the AR anchor, and the effect is illustrated in FIG. 8, thereby facilitating selection of the user. Of course, a matching way may also be randomly selecting multiple candidate templates, or selecting multiple candidate templates with higher use frequencies from a use history of the user, and the corresponding matching way falls in the scope of the disclosure. At block 72, when the user triggers one of the multiple candidate templates, the processor may determine the candidate template as the target template. Accordingly, the target template includes the target shape of the moving shot track and the relative position between the reference point and the moving shot track.

Figure 9:
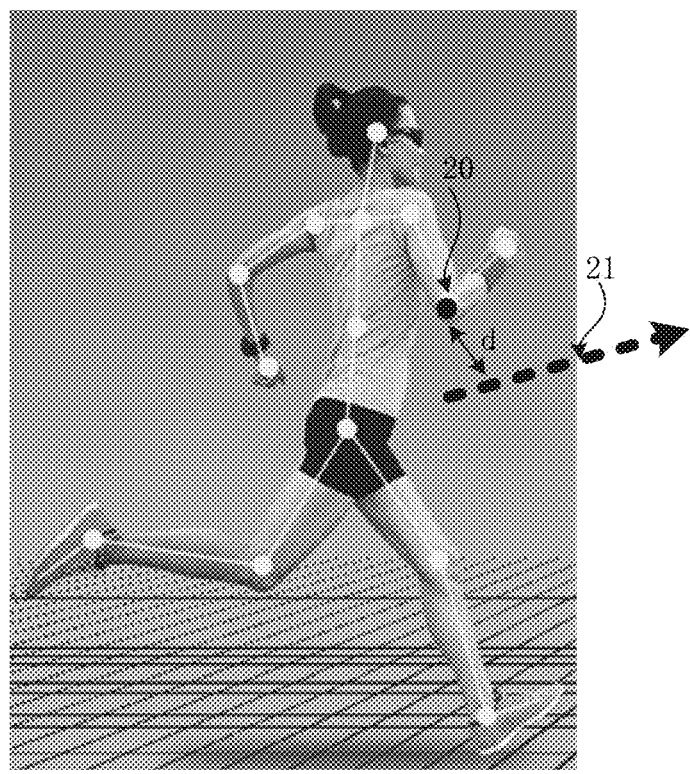
FIG. 9 is a schematic diagram illustrating an effect of displaying a moving shot track according to some embodiments.

At block 62, the processor may superimpose the AR anchor and the reference point, such that the AR anchor coincides with the reference point. The processor may generate the moving shot track that passes through the current position of the shot and matches the target shape when the AR anchor coincides with the reference point, and the effect is illustrated in FIG. 9. Referring to FIG. 9, when the user selects the feature point 20 of the character as the AR anchor and selects the template 3, the horizontal line segment 21 from left to right may be obtained, and a horizontal distance between the horizontal line segment 21 and the AR anchor is d (i.e., the relative position between the reference point and the moving shot track).

For another example, a preset rule is stored in the electronic device, and the preset rule may include multiple rules for generating the movement shot track. For example, taking the AR anchor as the center, a circle passing through the current position or a circle with a preset radius is generated, and the circle corresponds to the moving shot skill of the surround when is taken as the moving shot track. For another example, when the reference point with the distance d from the AR anchor in the horizontal direction is taken as the start point or the current position is taken as the start point, a vertical line segment from top to bottom is generated, and the vertical line segment corresponds to the moving shot skill of the drop when taken as the moving shot track. For another example, when the reference point with the distance d from the AR anchor in the horizontal direction is taken as the start point or the current position is taken as the start point, the horizontal line segment from left to right is generated, and the horizontal line segment corresponds to the moving shot skill of the truck when taken as the moving shot track. It should be noted that, merely a few rules are listed above. A corresponding rule may be set based on a detailed moving shot skills, such as the following shot, the pan & tilt shot, the dolly zoom in shot, and the dolly zoom out shot, and the corresponding templates fall into the scope of the disclosure.

Figure 10:
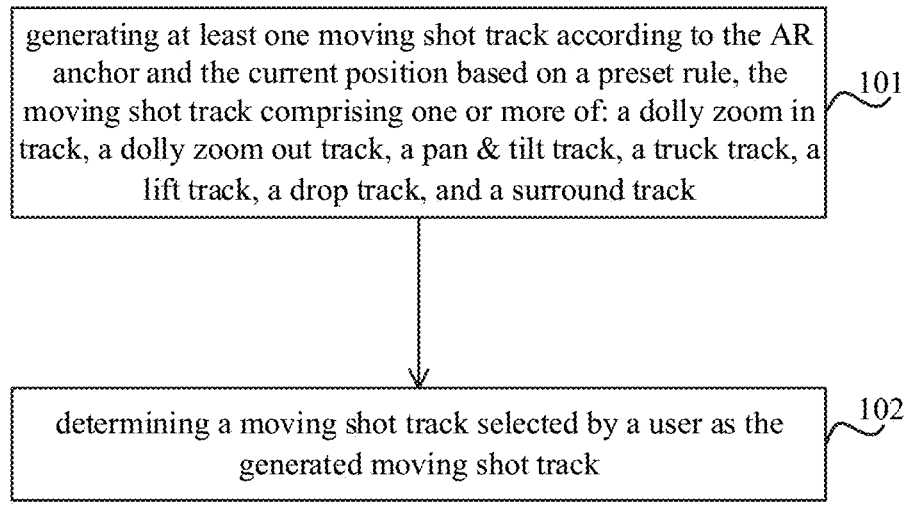
FIG. 10 is a flow chart illustrating generating a moving shot track according to some embodiments.
Figure 11:
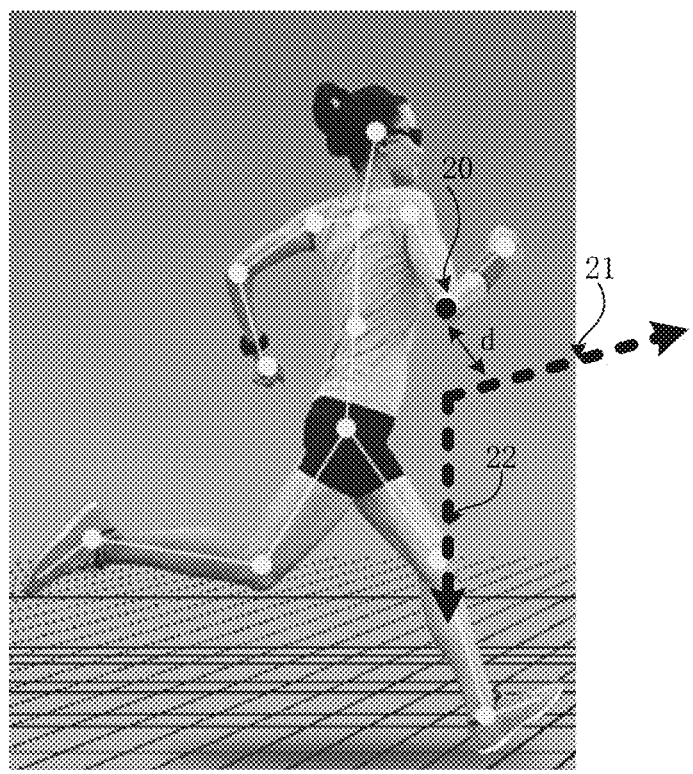
FIG. 11 is a schematic diagram illustrating an effect of displaying two moving shot tracks according to some embodiments.

Referring to FIG. 10, at block 101, the processor may generate at least one moving shot track according to the AR anchor and the current position based on the preset rule, and the effect is illustrated as FIG. 11. Referring to FIG. 11, the processor generates a moving shot track 21 and a moving shot track 22. At block 102, the processor may detect the trigger operation of the user and determine the moving shot track selected by the user as the generated moving shot track.

In a practical application, multiple objects may be included in the image viewfinder. A moving shot track generated based on the template or the preset rule may pass through a certain object. In this case, the user may be in danger in the moving shot process. Therefore, in some embodiments, referring to FIG. 12, at block 121, the processor may compare the moving shot track and the position of the object in the image viewfinder, to determine whether the object is located in the moving shot track. At block 122, when the object exists in the moving shot track, the processor may adjust a part of the moving shot track around the object, and take the adjusted moving shot track as a final moving shot track; otherwise, no adjustment is made. In this way, in embodiments, through performing adaptive adjustment on the moving shot track, the safety of the user is ensured while the moving shot photography is implemented.

At block 14, image collection is performed on the photographed object based on the moving shot track.

In embodiments, the user may perform the image collection on the photographed object based on a guidance of the moving shot track, such as a video may be photographed and continuous images may be photographed.

Figure 13:
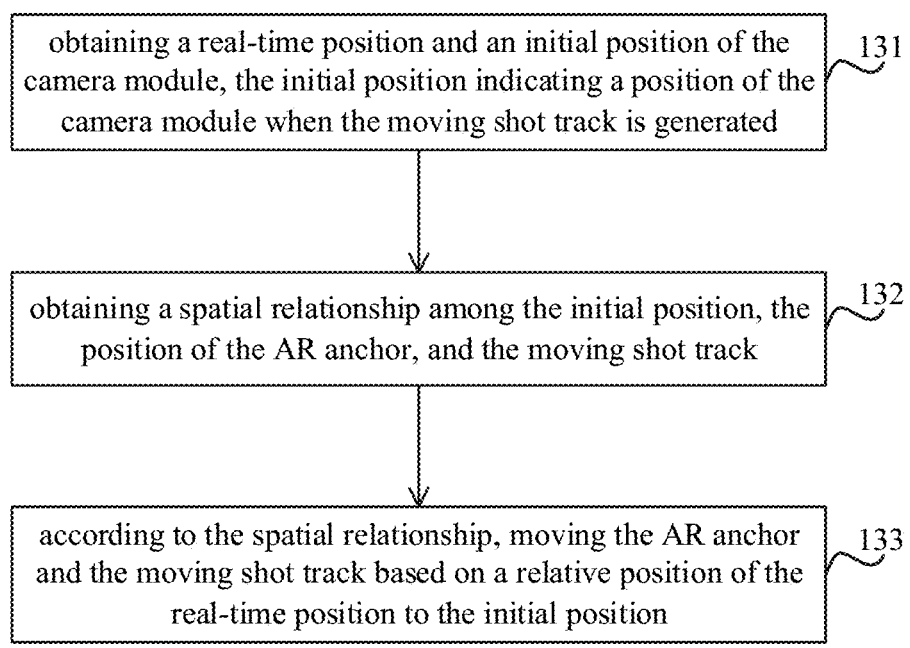
FIG. 13 is a flow chart illustrating a photography method according to some embodiments.

In practical application, the user may move the electronic device after the image viewfinder is generated. At this time, referring to FIG. 13, at block 131, the processor may obtain a real-time position and an initial position of the camera module. The initial position indicates a position of the camera module when the moving shot track is generated. At block 132, the processor may obtain a spatial relationship among the initial position, the position of the AR anchor, and the moving shot track. It should be noted that, the spatial relationship among the initial position, the position of the AR anchor, and the moving shot track is actually obtained when the moving shot track is obtained. Therefore, the spatial relationship may be calculated in advance and stored in a specific position for subsequent use. At block 133, the processor may, move the AR anchor and the moving shot track according to a position relative of the real-time position to the initial position based on the spatial relationship, thereby adjusting a display part of the moving shot track in the display screen. In this way, the amount of processed data may be reduced, and the user experience may be improved by dynamically displaying the moving shot track.

Figure 14:
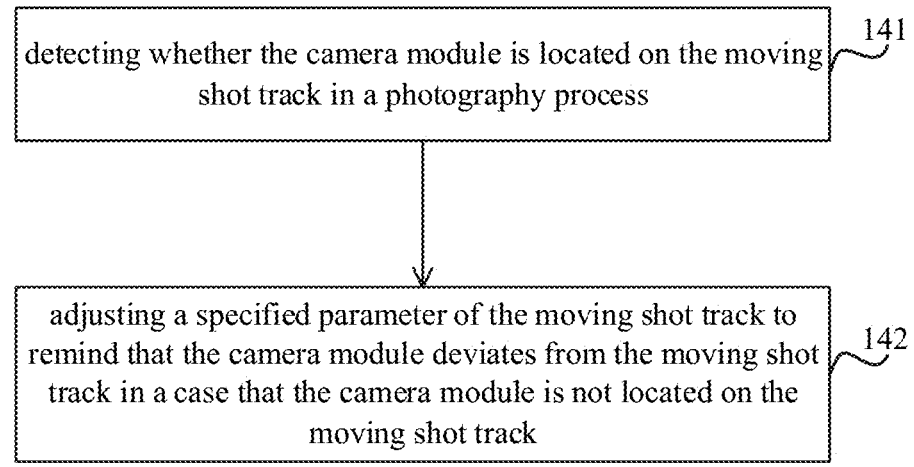
FIG. 14 is a flow chart illustrating a photography method according to some embodiments.
Figure 15:
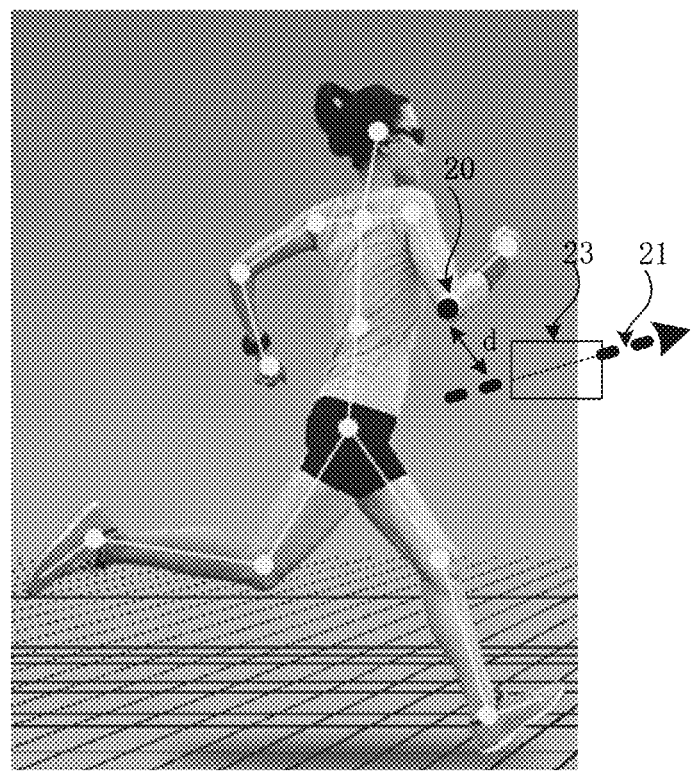
FIG. 15 is a schematic diagram illustrating adjusting a specified parameter of the moving shot track according to some embodiments.

In practical application, the user or the shot may deviate from the moving shot track during the moving mirror photography. Therefore, in embodiments, referring to FIG. 14, at block 141, the processor may detect whether the camera module is located in the moving shot track in a photography process. At block 142, a specified parameter (such as a color, a width, a virtual and real line, a moving speed, or a strobe) of the moving shot track is adjusted to remind that the camera module deviates from the moving shot track in a case that the camera module is not located in the moving shot track, and the effect is illustrated in FIG. 15. The moving shot track at block 23 is thinned to remind the user that the moving shot track is far away. In this way, in embodiments, it may be ensured that the user may operate the moving shot accurately to obtain a high-quality video.

In embodiments, the moving shot track is displayed in the virtual reality scene, thereby facilitating the user to use the moving shot photography skill based on the moving shot track, and obtaining the high-quality video. Meanwhile, in embodiments, there is no need to carry extra hardware, thereby reducing the cost. In addition, the user does not need professional moving shot knowledge, thereby reducing a learning cost and facilitating to improve photography experience.

Description will be made below to the photography method in communication with various moving shot skills.

A dolly zoom in shot or a dolly zoom out shot

Description: a photographer does not move, and the shot is moved towards the object from far.

Implementation:
1. selecting a photographed object and a template;
2. selecting an AR anchor and the photographed object to generate a moving shot track; and
3. performing, by the photographer, image collection based on the moving shot track.

A Pan & Tilt Shot

Description: a photographer moves, a position of a shot is fixed, and a photography angle of the shot follows the movement of the photographer.

Implementation:
1. selecting, by the photographer, a photographed object and a template; and
2. dynamically recognizing a position of the photographed object, and moving the shot based on the position for image collection.

A Truck Shot

Description: a fixed distance is kept between a photographed object and a shot, and the shot moves with the photographed object.

Implementation:
1. selecting, by a photographer, an AR anchor, the photographed object and the template;
2. generating a moving shot track at a fixed distance and a fixed direction of the AR anchor; and
3. detecting a position of the photographed object in each frame of a video, and the photographer moving in parallel to collect images.

A Lift

Description: a camera moves based on a direction from top to bottom or from bottom to top.

Implementation:
1. selecting, by a photographer, an AR anchor, a photographed object and a template;
2. associating a placement height of the AR anchor with a height of the photographed object based on the direction from top to bottom or from bottom to top; and
3. displaying a moving shot track and a position with a fixed distance as a start point for image collection.

Figure 16:
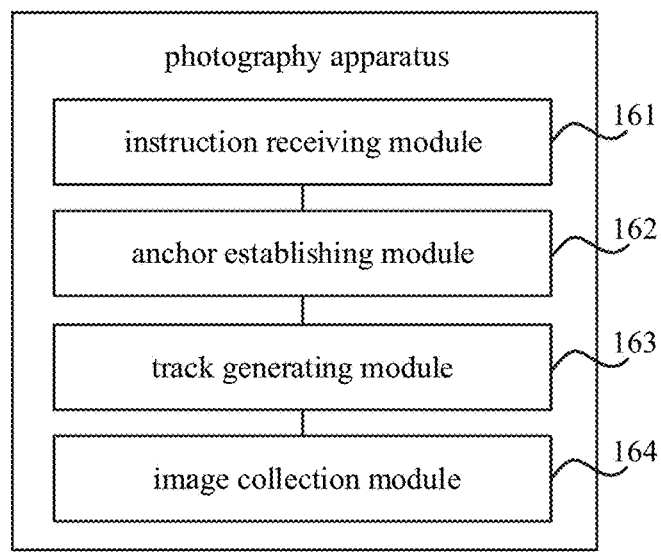
FIG. 16 is a block diagram illustrating a photography apparatus according to some embodiments.

On the basis of the photography method, embodiments of the disclosure also provide a photography apparatus, applicable to an electronic device provided with a camera module thereon. Referring to FIG. 16, the apparatus also includes: an instruction receiving module 161, an anchor establishing module 162, a track generating module 163, and an image collection module 164.

The instruction receiving module 161 is configured to receive an instruction of launching to collect images.

The anchor establishing module 162 is configured to establish an AR anchor in an image viewfinder of the electronic device. The AR anchor corresponds to a position of a photographed object in a virtual three-dimensional space.

The track generating module 163 is configured to generate a moving shot track in the image viewfinder based on a current position of the camera module and the AR anchor.

The moving shot track represents a desired moving route of the camera module in the virtual three-dimensional space.

The image collection module 164 is configured to perform image collection on the photographed object based on the moving shot track.

In some embodiments, the anchor establishing module includes: a feature point obtaining unit and an anchor determining unit. The feature point obtaining unit is configured to obtain multiple feature points of each object in the image viewfinder. The anchor determining unit is configured to determine one feature point from the multiple feature points as the AR anchor. An object located by the AR anchor is taken as the photographed object, and a position of the AR anchor corresponds to the position of the photographed object in the virtual three-dimensional space.

In some embodiments, the feature point obtaining unit includes: an image obtaining subunit, and a feature point obtaining subunit. The image obtaining subunit is configured to obtain a plane image and a depth image of a preview scene in the image viewfinder. The feature point obtaining subunit is configured to obtain the multiple feature points of each object in the preview scene based on the depth image.

In some embodiments, the feature point obtaining unit includes: an image obtaining subunit, a feature point extracting subunit, and a feature point determining subunit. The image obtaining subunit is configured to obtain a plane image and a depth image of a preview scene in the image viewfinder. The feature point extracting subunit is configured to obtain multiple feature points in the plane image based on a preset feature point extraction model. The feature point determining subunit is configured to determine depth data of each feature point based on the depth image to obtain the plurality of feature points of each object.

In some embodiments, the track generating module includes: a template obtaining unit, and a track generating unit. The template obtaining unit is configured to obtain a target template from a preset template library. The target template includes a target shape of the moving shot track, and a relative position between a reference point and the moving shot track. The track generating unit is configured to generate the moving shot track which passes through the current position and is matched with the target shape in a case that the AR anchor coincides with the reference point.

In some embodiments, the template obtaining unit includes: a template display subunit, and a template determining subunit. The template display subunit is configured to display templates in the preset template library, the templates including at least one of: a dolly zoom in template, a dolly zoom out template, a pan & tilt template, a truck template, a lift template, a drop template, and a surround template. The template determining subunit is configured to obtain a template corresponding to a trigger operation as the target template in a case that the trigger operation for selecting the template is detected.

In some embodiments, the track generating module includes: a track generating unit, and a track determining unit. The track generating unit is configured to generate at least one moving shot track according to the AR anchor and the current position based on a preset rule, the moving shot track including one or more of: a dolly zoom in track, a dolly zoom out track, a pan & tilt track, a truck track, a lift track, a drop track, and a surround track. The track determining unit is configured to determine a moving shot track selected by a user as the generated moving shot track.

In some embodiments, the apparatus also includes: a position comparing module, and a track adjusting module. The position comparing module is configured to compare the moving shot track with a position of each object in the image viewfinder. The track adjusting module is configured to adjust a part of the moving shot track around an object such that the moving shot track bypasses the object in a case that the object exists on the moving shot track.

In some embodiments, the image collection module includes: a position obtaining unit, a relationship obtaining unit, and a track moving unit. The position obtaining unit is configured to obtain a real-time position and an initial position of the camera module. The initial position indicates a position of the camera module when the moving shot track is generated. The relationship obtaining unit is configured to obtain a spatial relationship among the initial position, the position of the AR anchor, and the moving shot track. The track moving unit is configured to, according to the spatial relationship, move the AR anchor and the moving shot track based on a relative position of the real-time position to the initial position.

In some embodiments, the image collection module includes: a track detecting unit, and a track adjusting unit. The track detecting unit is configured to detect whether the camera module is located on the moving shot track in a photography process. The track adjusting unit is configured to adjust a specified parameter of the moving shot track to remind that the camera module deviates from the moving shot track in a case that the camera module is not located on the moving shot track.

It may be understood that, the photography apparatus according to embodiments of the disclosure corresponds to the above photography method. Detailed contents of the photography apparatus may be referred to the contents of each embodiment of the photography method, which are not be elaborated herein.

Figure 17:
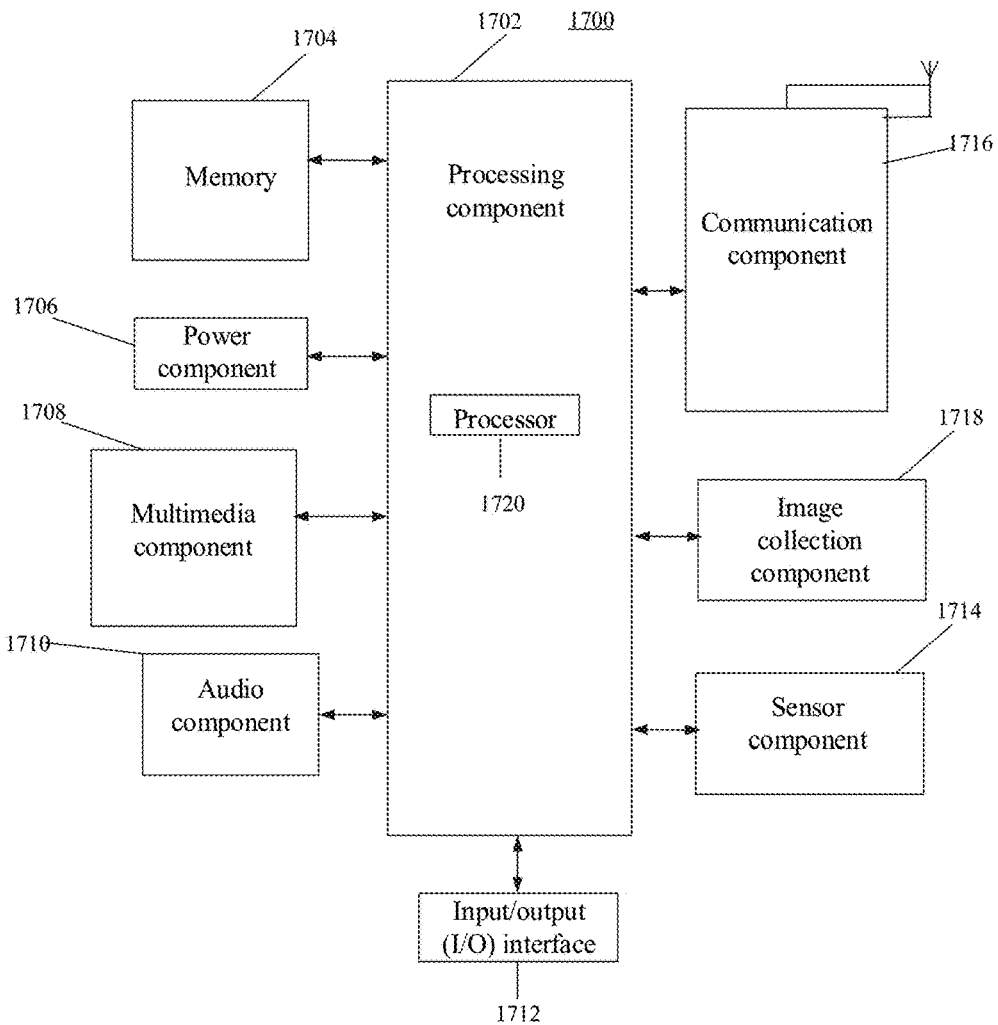
FIG. 17 is a block diagram illustrating an electronic device according to some embodiments.

FIG. 17 is a block diagram illustrating an electronic device according to some embodiments. For example, the electronic device 1700 may be a mobile phone, a computer, a digital broadcasting terminal, a tablet device, a medical device, a fitness equipment, a personal digital assistant or the like.

Figure 12:
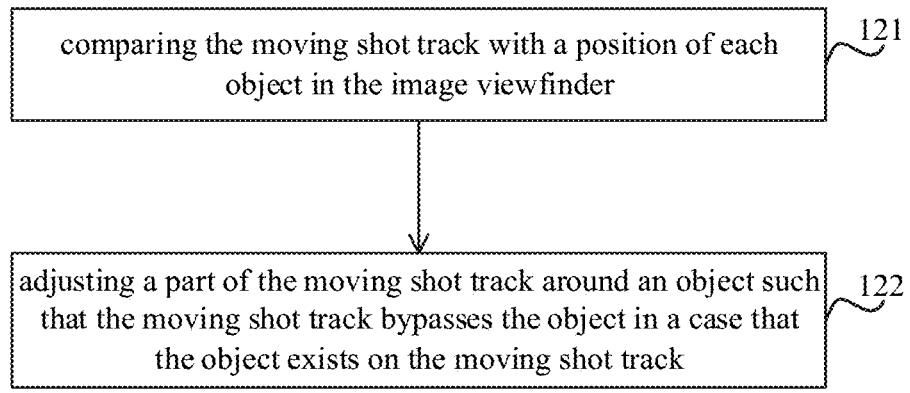
FIG. 12 is a flow chart illustrating a photography method according to some embodiments.

As illustrated in FIG. 12, the electronic device 1700 may include one or more of: a processing component 1702, a memory 1704, a power component 1706, a multimedia component 1708, an audio component 1710, an input/output (I/O) interface 1712, a sensor component 1714, a communication component 1716, and an image collection component 1718.

The processing component 1702 typically controls overall operations of the electronic device 1700, such as the operations associated with display, telephone calls, data communications, camera operations, and recording operations. The processing component 1702 may include one or more processors 1702 for executing a computer program. Moreover, the processing component 1702 may include one or more modules which facilitate the interaction between the processing component 1702 and other components. For example, the processing component 1702 may include a multimedia module to facilitate the interaction between the multimedia component 1708 and the processing component 1702.

The memory 1704 is configured to store various types of data to support the operation of the electronic device 1700. Examples of such data include a computer program for any application or method operated on the electronic device 1700 for performing contraction data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 is configured to provide power to various components of the electronic device 1700. The power component 1706 may include a power management system, one or more power sources, and any other components associated with the generation, management, and distribution of power in the electronic device 1700. The power component 1706 may include a power chip. The controller may communicate with the power chip, to control the power chip to turn on or turn off a switching device, such that the battery may supply power to the motherboard circuit or not.

The multimedia component 1708 includes a screen providing an output interface between the electronic device 1700 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action.

The audio component 1710 is configured to output and/or input an audio signal. For example, the audio component 1710 includes a microphone ("MIC") for receiving an external audio signal when the electronic device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output the audio signal.

The I/O interface 1712 is configured to provide an interface between the processing component 1702 and peripheral interface modules, such as a keyboard, a click wheel, buttons, and the like.

The sensor component 1714 includes one or more sensors for providing status assessments of various aspects of the electronic device 1700. For example, the sensor component 1714 may detect an open/closed status of the electronic device 1700, relative positioning of components, e.g., the display and the keypad of the electronic device 1700, a change in position of the electronic device 1700 or a component of the electronic device 1700, a presence or absence of user contraction with the electronic device 1700, an orientation or an acceleration/deceleration of the electronic device 1700, and a change in temperature of the electronic device 1700. In an example, the sensor component 1714 may include a magnetic sensor, a gyroscope and a magnetic field sensor. The magnetic field sensor includes at least one of: a Hall sensor, a thin film magneto resistive sensor, and a magnetic liquid acceleration sensor.

The communication component 1716 is configured to facilitate communication, wired or wirelessly, between the electronic device 1700 and other devices. The electronic device 1700 may access a wireless network based on a communication standard, such as Wi-Fi, 2G, 3G, 4G, 5G, or a combination thereof. In some embodiments, the communication component 1716 receives a broadcast signal or broadcast associated information from an external broadcast management system via a broadcast channel. In some embodiments, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the electronic device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In some embodiments, there is also provided a non-transitory computer-readable storage medium including a computer program, such as the memory 1704 including the computer program. The computer program may be executed by the processor in the electronic device 1700 for performing the above method. For example, the non-transitory computer-readable storage medium may be a ROM, a RAM, a CD-ROM, a magnetic tape, a floppy disc, an optical data storage device, and the like.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come in known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A photography method, applicable to an electronic device provided with a camera module thereon, comprising:
   receiving an instruction of launching to collect images;
   establishing an augmented reality (AR) anchor in an image viewfinder of the electronic device, the AR anchor corresponding to a position of a photographed object in a virtual three-dimensional space;
   generating a moving shot track in the image viewfinder based on a current position of the camera module and the AR anchor, the moving shot track representing a desired moving route of the camera module in the virtual three-dimensional space; and
   performing image collection on the photographed object based on the moving shot track,
   wherein generating the moving shot track in the image viewfinder based on the current position of the camera module and the AR anchor comprises:
   obtaining a target template from a preset template library, the target template comprising a target shape of the moving shot track, and a relative position between a reference point and the moving shot track; and
   generating the moving shot track which passes through the current position and is matched with the target shape in a case that the AR anchor coincides with the reference point,
   wherein obtaining the target template from the preset template library comprises:
   displaying templates in the preset template library, the templates comprising at least one of: a dolly zoom in template, a dolly zoom out template, a pan & tilt template, a truck template, a lift template, a drop template, and a surround template; and
   obtaining a template corresponding to a trigger operation as the target template in a case that the trigger operation for selecting the template is detected.

2. The photography method as claimed in claim 1, wherein establishing the AR anchor in the image viewfinder of the electronic device comprises:
   obtaining a plurality of feature points of each object in the image viewfinder; and
   determining one feature point from the plurality of feature points as the AR anchor, an object located by the AR anchor being taken as the photographed object, and a position of the AR anchor corresponding to the position of the photographed object in the virtual three-dimensional space.

3. The photography method as claimed in claim 2, wherein obtaining the plurality of feature points of each object in the image viewfinder comprises:
   obtaining a plane image and a depth image of a preview scene in the image viewfinder; and
   obtaining the plurality of feature points of each object in the preview scene based on the depth image.

4. The photography method as claimed in claim 2, wherein obtaining the plurality of feature points of each object in the image viewfinder comprises:
   obtaining a plane image and a depth image of a preview scene in the image viewfinder;
   obtaining a plurality of feature points in the plane image based on a preset feature point extraction model; and
   determining depth data of each feature point based on the depth image to obtain the plurality of feature points of each object.

5. The photography method as claimed in claim 1, wherein generating the moving shot track in the image viewfinder based on the current position of the camera module and the AR anchor comprises:
   generating at least one moving shot track according to the AR anchor and the current position based on a preset rule, the moving shot track comprising one or more of: a dolly zoom in track, a dolly zoom out track, a pan & tilt track, a truck track, a lift track, a drop track, and a surround track; and
   determining a moving shot track selected by a user as the generated moving shot track.

6. The photography method as claimed in claim 1, after generating the moving shot track, further comprising:
   comparing the moving shot track with a position of each object in the image viewfinder; and
   adjusting a part of the moving shot track around an object such that the moving shot track bypasses the object in a case that the object exists on the moving shot track.

7. The photography method as claimed in claim 1, wherein performing the image collection on the photographed object based on the moving shot track comprises:
   obtaining a real-time position and an initial position of the camera module, the initial position indicating a position of the camera module when the moving shot track is generated;
   obtaining a spatial relationship among the initial position, the position of the AR anchor, and the moving shot track; and according to the spatial relationship, moving the AR anchor and the moving shot track based on a relative position of the real-time position to the initial position.

8. The photography method as claimed in claim 1, wherein performing the image collection on the photographed object based on the moving shot track comprises:
detecting whether the camera module is located on the moving shot track in a photography process; and
adjusting a specified parameter of the moving shot track to remind that the camera module deviates from the moving shot track in a case that the camera module is not located on the moving shot track.

9. An electronic device, comprising:
a camera;
a processor; and
a memory, configured to store a computer program executable by the processor,
wherein the processor is configured to execute the computer program in the memory to:
receive an instruction of launching to collect images;
establish an augmented reality (AR) anchor in an image viewfinder of the electronic device, the AR anchor corresponding to a position of a photographed object in a virtual three-dimensional space;
generate a moving shot track in the image viewfinder based on a current position of the camera module and the AR anchor, the moving shot track representing a desired moving route of the camera module in the virtual three-dimensional space; and
perform image collection on the photographed object based on the moving shot track,
wherein the processor is further configured to execute the computer program in the memory to:
obtain a target template from a preset template library, the target template comprising a target shape of the moving shot track, and a relative position between a reference point and the moving shot track; and
generate the moving shot track which passes through the current position and is matched with the target shape in a case that the AR anchor coincides with the reference point,
wherein the processor is further configured to execute the computer program in the memory to:
display templates in the preset template library, the templates comprising at least one of: a dolly zoom in template, a dolly zoom out template, a pan & tilt template, a truck template, a lift template, a drop template, and a surround template; and
obtain a template corresponding to a trigger operation as the target template in a case that the trigger operation for selecting the template is detected.

10. The electronic device as claimed in claim 9, wherein the processor is further configured to execute the computer program in the memory to:
obtain a plurality of feature points of each object in the image viewfinder; and
determine one feature point from the plurality of feature points as the AR anchor, an object located by the AR anchor being taken as the photographed object, and a position of the AR anchor corresponding to the position of the photographed object in the virtual three-dimensional space.

11. The electronic device as claimed in claim 10, wherein the processor is further configured to execute the computer program in the memory to:
obtain a plane image and a depth image of a preview scene in the image viewfinder; and
obtain the plurality of feature points of each object in the preview scene based on the depth image.

12. The electronic device as claimed in claim 10, wherein the processor is further configured to execute the computer program in the memory to:
obtain a plane image and a depth image of a preview scene in the image viewfinder;
obtain a plurality of feature points in the plane image based on a preset feature point extraction model; and
determine depth data of each feature point based on the depth image to obtain the plurality of feature points of each object.

13. The electronic device as claimed in claim 9, wherein the processor is further configured to execute the computer program in the memory to:
generate at least one moving shot track according to the AR anchor and the current position based on a preset rule, the moving shot track comprising one or more of: a dolly zoom in track, a dolly zoom out track, a pan & tilt track, a truck track, a lift track, a drop track, and a surround track; and
determine a moving shot track selected by a user as the generated moving shot track.

14. The electronic device as claimed in claim 9, wherein the processor is further configured to execute the computer program in the memory to:
compare the moving shot track with a position of each object in the image viewfinder; and
adjust a part of the moving shot track around an object such that the moving shot track bypasses the object in a case that the object exists on the moving shot track.

15. The electronic device as claimed in claim 9, wherein the processor is further configured to execute the computer program in the memory to:
obtain a real-time position and an initial position of the camera module, the initial position indicating a position of the camera module when the moving shot track is generated;
obtain a spatial relationship among the initial position, the position of the AR anchor, and the moving shot track; and
according to the spatial relationship, move the AR anchor and the moving shot track based on a relative position of the real-time position to the initial position.

16. A non-transitory computer-readable storage medium having stored therein instructions that, when executed by a processor, causes the processor to perform a photography method, the method being applicable to an electronic device provided with a camera module thereon, and comprising:
receiving an instruction of launching to collect images;
establishing an augmented reality AR anchor in an image viewfinder of the electronic device, the AR anchor corresponding to a position of a photographed object in a virtual three-dimensional space;
generating a moving shot track in the image viewfinder based on a current position of the camera module and the AR anchor, the moving shot track representing a desired moving route of the camera module in the virtual three-dimensional space; and
performing image collection on the photographed object based on the moving shot track,
wherein generating the moving shot track in the image viewfinder based on the current position of the camera module and the AR anchor comprises:
obtaining a target template from a preset template library, the target template comprising a target shape of the moving shot track, and a relative position between a reference point and the moving shot track; and generating the moving shot track which passes through the current position and is matched with the target shape in a case that the AR anchor coincides with the reference point, wherein obtaining the target template from the preset template library comprises:

displaying templates in the preset template library, the templates comprising at least one of: a dolly zoom in template, a dolly zoom out template, a pan & tilt template, a truck template, a lift template, a drop template, and a surround template; and obtaining a template corresponding to a trigger operation as the target template in a case that the trigger operation for selecting the template is detected.

\* \* \* \* \*